United States Patent [19]

Engelking

[11] 4,385,388
[45] May 24, 1983

[54] LIGHT REFERENCING METHOD

[75] Inventor: Paul C. Engelking, Lowell, Oreg.

[73] Assignee: State Board of Higher Eductation for and on behalf of the University of Oregon, Eugene, Oreg.

[21] Appl. No.: 257,818

[22] Filed: Apr. 27, 1981

[51] Int. Cl.$^3$ .............................................. H01S 3/13
[52] U.S. Cl. ..................................................... 372/32
[58] Field of Search ....................... 372/28, 32, 33, 56

[56] References Cited

U.S. PATENT DOCUMENTS 3,613,026  10/1971  Skolnick ................................. 372/32
3,720,877  3/1973  Zarowin ................................. 372/56

OTHER PUBLICATIONS

Nathanson, J. Chem. Phys. 74(1), Jan. 1, 1981.
Yardley, J. Chem. Phys. 74(1), Jan. 1, 1981.
Lee, Optics Letters 3(4), Oct. 1978.
Thrush, Nature, 4525, Jul. 21, 1956.
Duncan, J. Chem. Phys. 44(1979) 415–419.
Chou, J. of Applied Physics, 48(4), Apr. 1977.
"Frequency Stabilization of 0.633-$\mu$m Line with the Aid of 3.39-$\mu$m Line Locked to CH$_4$", Nakazawa et al., Appl. Phys. Lett. 35(10), Nov. 15, 1979, pp. 745–747.

Primary Examiner—William L. Sikes
Assistant Examiner—C. J. Britton
Attorney, Agent, or Firm—Kolisch, Hartwell & Dickinson

[57] ABSTRACT

A method for referencing the beam wavelength of a tunable laser with a known spectral line wavelength of a free transition metal atom. A voltage is placed across a pair of electrodes in a cell containing vapor of an organometallic compound of that metal. The vapor is irradiated with a pulse of focused laser light having an average flux density at which electronic transitions of the free transition metal atom are wavelength dependent. The vapor undergoes photodissociation to form free metal atoms. The wavelength of the focused laser light is adjusted until peak current flow across the two electrodes is observed, evidencing photoionization of the free metal atoms proceeding through an excited state corresponding to the referencing wavelength.

10 Claims, 2 Drawing Figures

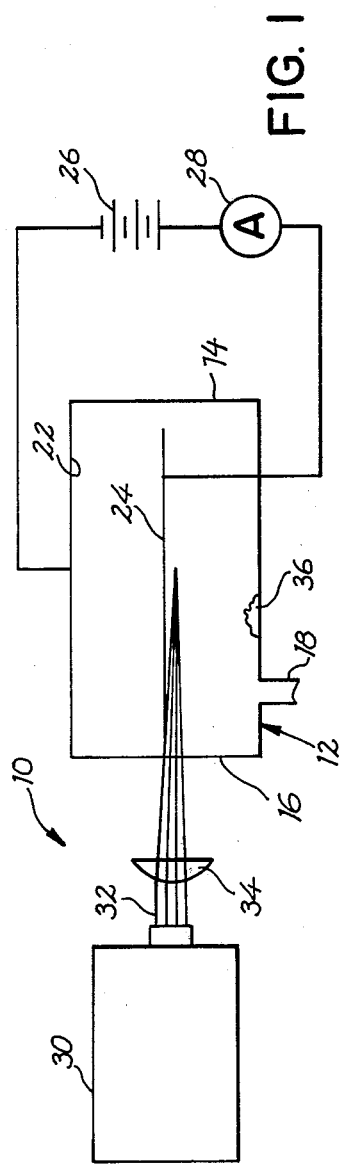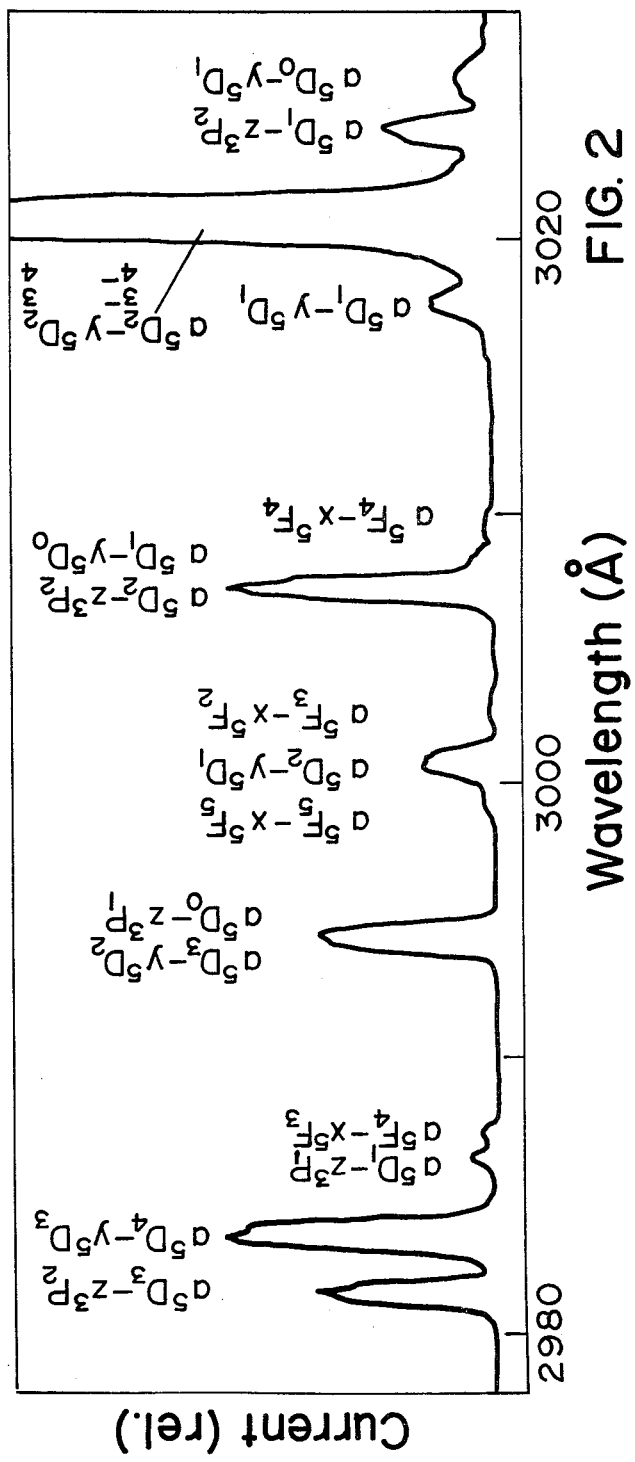

LIGHT REFERENCING METHOD

BACKGROUND AND SUMMARY

The present invention relates to light referencing methods, and in particular, to a method for referencing the wavelength of a tunable laser.

Tunable lasers which operate in the visible or ultraviolet light region are used in a variety of experimental and commercial settings. Often it is important to operate a tunable laser at a precisely known beam wavelength. One prior art method for setting (and holding) a laser beam at a known wavelength is to reference the beam, in a spectrometer, with a known spectral line wavelength produced by an atomic emission lamp. A disadvantage of this method is that the requisite high-quality spectrometer and the associated photomultiplier tubes are quite expensive, as are the reference atomic emission lamp and its associated power supply.

It has also been proposed, as a method of referencing a laser light beam, to use the laser beam directly as an exciting light source to produce excited states in free metal atoms at known spectral-line wavelengths associated with the atoms. The use of atomic reference standards, as opposed to molecular standards, allows the user to trace wavelength calibration back to international standards. This approach has been limited heretofore by the problems inherent in producing a vapor of most transition metal elements from a solid sample of the metal.

It is therefore one general object of the present invention to provide a laser referencing technique which overcomes above-discussed problems associated with laser wavelength referencing techniques known in the prior art.

A more specific object of the invention is to provide a simple, relatively inexpensive method for referencing the light frequency of a tunable laser with a known spectral line wavelength of a free transition metal atom. Another object of the invention is to provide such a method which is usable for a referencing laser beam wavelength in both visible and ultraviolet light ranges.

It is a further object of the invention to provide such a method which can be practiced with a wide range of transition metal atoms.

In the method of the invention, a voltage is placed across a pair of electrodes in a cell containing vapor of an organometallic compound containing the desired transition metal atom. The vapor is irradiated with a non-saturating pulse of focused laser light, that is, a pulse having an average flux density level at which electronic-excitation transitions of the free metal atoms are wavelength dependent. The pulse produces multi-photon dissociation of the organometallic compound, resulting in free metal atoms in the vapor. A population of these atoms become photoionized through a multi-photon process that involves an excited state of the metal atom. The laser wavelength is adjusted until a peak current flow across the electrodes is observed, evidencing maximum photoionization which occurs when the laser wavelength is set at a spectral line of the free metal atom.

These and other objects and features of the present invention will become more fully apparent when the following detailed description of the invention is read in conjunction with the figures, wherein:

FIG. 1 shows, in simplified form, apparatus used in practicing the invention; and FIG. 2 is a graph obtained by the method of the invention, showing measured current levels as a function of laser wavelength in the indicated wavelength range for the compound bis-cyclopentadienyl iron (ferrocene).

DETAILED DESCRIPTION OF THE INVENTION

Apparatus used in practicing the present invention is shown generally at 10 in FIG. 1. The apparatus includes a cylindrical glass cell 12 which is sealed at its right end in the figure by a removable cap, indicated here schematically by a line 14. The left end of the cell in the figure is covered by a quartz glass window, indicated here by a line 16, which is transparent to visible and ultraviolet light. A port 18 in the cell is connected to a conventional vacuum source for evacuating air from the cell.

The inner cylindrical wall portion of cell 12 is coated with a film of conductive metal such as silver, forming a cathodic electrode 22 in the cell. An anodic electrode 24 in the cell is formed of an elongate conductive wire extending axially substantially along the length of the cell, as shown. A voltage source 26 placed between the two electrodes is operable to place a desired voltage across the two electrodes. A current measuring device, represented in the figure as an ammeter 28, is used in measuring current flow across the electrodes. The measuring device includes a chart recorder and a current amplifier which inputs the recorder.

A tunable laser whose wavelength it is desired to reference by the method of the invention is shown at 30. Laser 30 may be any conventional laser which is tunable in visible or ultraviolet light ranges, and which can be operated at an average power level which is preferably in the milliwatt to ten watt range. A light beam 32 from the laser is focused by a quartz lens 34 to produce a power flux of between about 10-200 megawatts per square centimeter at the focal region of the lens in cell 12. In the invention described herein, laser 30 is operable to produce a pulsed beam, each pulse having an average power flux within the range just noted.

In the method of the invention, a sample of a volatile organometallic compound, indicated in the figure at 36, is placed in cell 12, to form a vapor of the compound in the cell. The compound contains a transition metal element which in free metal atom form, has a spectral line at the desired referencing wavelength. Any transition metal element in the periodic table groups III-B, IV-B, V-B, VI-6, VII-B, VIII, I-B and II-B which form volatile organometallic compounds of the type described below may be selected. Tables of characteristic spectral lines of transition metal elements may be found in well-known reference texts.

Transition metal elements in the groups just noted complex with one or more of a variety of carbon-containing groups to form organometallic compounds suitable for use in practicing the invention. Specifically, such compounds must be volatile and readily dissociated by visible or UV light to produce free metal atoms. Cyclobutadiene $(CH)_4$, cyclopentadiene $(CH)_5$, benzene $(CH)_6$, and cyclooctatetraene $(CH)_8$ are representative of groups which complex with transition metals to form such compounds. Carbonyl CO represents another important carbon-containing group in organometallic compounds suitable for use in the invention.

The transition metal may be complexed to one species only of a carbon-containing group, as exemplified by the compounds iron pentacarbonyl (Fe(CO)$_5$), nickel tetracarbonyl (Ni(CO)$_4$), biscyclopentadienyl iron (ferrocene) (Fe(C$_5$H$_5$)$_2$) and dibenzene chromium (Cr(C$_6$H$_6$)$_2$). Mixed ligand transition compounds containing the transition metal, one of the above-named unsaturated ring groups and one or more other liganding groups which may include carbonyl (CO), nitrosyl (NO) and halides (Cl, Br, and I) are also suitable. Examples of the latter compounds include biscyclopentadienyl titanium dichloride ((C$_5$H$_5$)$_2$TiCl$_2$), cyclopentadienyl nickel nitrosyl (Ni(C$_5$H$_5$)NO) and dicarbonly cyclopentadienyl cobalt (Co(CO)$_2$C$_5$H$_5$). The inclusion of halide groups generally increases the volatility of the organometallic compound. The reader is referred to Rausch, M.D. "Cyclopentadienyl Compounds of Metals and Metalloids", *Journal of Chemical Education* 37 (11) p. 568-578, November, 1960, for a listing of compounds of the type here described which contain at least one cyclopentadienyl group. As noted in the article, all of the transition metal elements in the groups indicated above except technicium, platinum, silver, and gold form cyclopentadienyl organometallic compounds.

Continuing with a description of the method, the cell is sealed and evacuated to a pressure of about one torr. The bulk of atmospheric gases are removed from the cell to reduce quenching of photoproduced excited-state metal atoms and metal ions in the cell. After the cell is evacuated, port 18 is closed and thereafter the sample in the cell reaches a vapor-phase equilibrium.

Vapor of the organometallic compound in cell 12 is irradiated by pulsed laser light, with such producing free metal atoms by a multiphoton photodissociation process. According to an important feature of the invention, the laser's average pulse beam energy is adjusted to produce a non-saturating power flux level at the focused region in the cell. That is, the power flux level is such that the population of free metal atoms which are electronically excited by the beam at non-resonant beam wavelengths is small compared to the population excited at resonant wavelengths. The beam wavelength is varied until a peak of measured current is observed, evidencing a peak level of photo-ionization.

Wavelength identification of the current peak generated by the method just described can be made in a number of ways. In a preferred method, the laser wavelength is incremented through a wavelength range in which a number of current peaks, each corresponding to a different spectral line of the free metal atom, are generated. As will be seen below, these peaks have characteristic peak heights, shapes and relative spacings which are distinctive and characteristic for that free metal atom. These peaks are compared with those on a standard graph in which current peaks have been plotted as a function of wavelength for the particular metal atom. In preparing the standard graph, laser beam wavelength, at each current peak, is determined by a conventional wavelength referencing technique, for example, by comparing the laser beam wavelength in a spectrometer with a known spectral line emission produced by an atomic emission lamp. Details of a standard current vs. wavelength graph of the type just described, and the manner in which the graph can be used to make current-peak identifications in practicing the method of the invention, will now be described by way of a specific example.

A solid example of ferrocene (Fe(C$_5$H$_5$)$_2$) was placed in cell 12 and the cell evacuated by a rotary vacuum pump to a pressure of about one torr. At room temperature the gas cell contained ferrocene vapor over solid ferrocene at an equilibrium vapor pressure of about $10^{-2}$ torr. Approximately 400 volts was placed across electrodes 22, 24. Pulse beam radiation from a Chromatix CMX-4 flash lamp UV dye laser was focused into the cell as described. Laser beam energy was set at 200 microjoules, which at the laser's pulse duration of 1 microsecond, produced an average power flux of about 200 megawatts per square centimeter at the focal region of lens 34 in cell 12. The pulse repetition frequency was set between 5 and 15 Hz. Photoionization current was recorded by device 28, as the laser beam wavelength was incremented at evenly spaced time intervals by an automatic tuning motor in the laser.

FIG. 2 shows a portion of a graph in which measured ionization current was plotted as a function of laser beam wavelength over a total wavelength range from about 2929 Å to 3265 Å. Laser wavelength was determined using a spectrometer to compare beam wavelength, at observed current peaks, with spectral lines produced by an iron atomic emission lamp. The graph shows a number of well-defined current peaks at wavelengths corresponding to known spectral lines in iron. The iron transition assignments associated with these wavelengths are noted above the associated peaks in the figure.

All of the current peaks observed in the above graph (shown partially in FIG. 2) are associated with single-photon spectral transitions in free iron. This observation, coupled with the fact that the singe-photon energy at the wavelengths employed is less than the ionization potential of atomic iron, argues for a two-photon photoionization process. It is thought that the process involves a wavelength-dependent, one-photon electronic excitation of a free metal atom, and absorption by the excited-state atom of a second photon to produce a free metal ion. A lack of any appreciable ion background detected when the laser is not tuned to an atomic iron transition indicates that photoionization of any vapor phase species other than free metal atoms is negligible.

The two-photon photoionization model is further supported by studies on the relationship between average laser pulse power and measured ionization current produced by the method of the present invention, using a ferrocene sample. Within the laser power range employed herein, this relationship was found to be quadratic, as would be expected for a two-photon process.

The two-photon iron spectrum table below is a tabulation of measured laser beam wavelengths at which prominent current peaks occurred in the above graph, along with the iron transition assignments for these wavelengths. The 3138 Å entry in parentheses in the table is the wavelength at which the combined energy of two photons is equal to the ionization potential for iron. That is, at laser beam wavelengths shorter than 3138 Å, (above this entry in the table) two-photon ionization can occur by photon energy input alone. At greater wavelengths (below the 3138 Å entry in the table), additional energy resulting from metal atom collisions must be supplied, assuming that photoionization occurs only by two-photon processes, as discussed above. The method of the invention is practiced routinely at a pulse beam duration (in the present example, one microsecond) which insures the occurrence of free metal atom collisions within the period of beam pulse.

TWO-PHOTON IRON SPECTRUM

| Wavelength, Angstroms | Error, Angstroms | Iron Assignments |
|---|---|---|
| 2929 | 0 | $a\,^5D_3 - y\,^5F_2°$ |
| 2937 | 0.1 | $a\,^5D_4 - y\,^5F_4°$ |
| 2942 | 0.7 | $a\,^5D_2 - y\,^5F_1°$ |
| 2948.5 | 1.6 | $a\,^5D_2 - y\,^5F_2°$ |
| 2954 | 0.1 | $a\,^5D_2 - y\,^5F_2°$ |
| 2957 | 0.4 | $a\,^5D_1 - y\,^5F_1°$ |
| 2967 | 2.4, 1.8 | $a\,^5D_0 - y\,^5F_1°$, $a\,^5D_1 - z\,^3P_0°$ |
| 2970.5 | 0.4 | $a\,^5D_1 - y\,^5F_2°$ |
| 2974 | 0.8 | $a\,^5D_2 - y\,^5F_3°$, $a\,^5D_3 - y\,^5F_4°$ |
| 2981 | 0.5 | $a\,^5D_3 - z\,^3P_2°$ |
| 2984 | 0.4 | $a\,^5D_4 - y\,^5D_3°$ |
| 2986 | 0.5 | $a\,^5D_1 - y\,^5D_1°$ |
| 2994.5 | 0.1 | $a\,^5D_0 - y\,^5D_1°$ |
| 3000.5 | 0.5 | $a\,^5D_2 - y\,^5D_1°$ |
| 3007 | 1.1 | $a\,^5D_2 - z\,^3P_2°$, $a\,^5D_1 - y\,^5D_0°$ |
| 3017.5 | 0.1 | $a\,^5D_1 - y\,^5D_1°$ |
| 3021.5 | 0.4 | $a\,^5D_2 - y\,^5D_2°$, $1\,^5D_4 - y\,^5D_4°$ |
| 3024.5 | 0.3 | $a\,^5D_0 - y\,^5D_1°$ |
| 3038 | 0.6 | $a\,^5D_1 - y\,^5D_2°$ |
| 3048 | 0.4 | $a\,^5D_2 - y\,^5D_3°$ |
| 3058.5 | 0.6 | $a\,^5D_3 - y\,^5D_4°$ |
| (3138) | | |
| 3180.5 | 0.3 | $a\,^5D_2 - z\,^3F_2°$ |
| 3184.5 | 0.4 | $a\,^5D_3 - z\,^3F_3°$ |
| 3192 | 1.2 | $a\,^5D_4 - z\,^3D_3°$ |
| 3193 | 0.2 | $a\,^5D_4 - z\,^3F_4°$ |
| 3196.5 | 0.5 | $a\,^5D_3 - z\,^3D_2°$ |
| 3227 | 0.3 | $a\,^5D_2 - z\,^3D_2°$ |
| 3231 | 1.9 | $a\,^5D_0 - z\,^3D_1°$ |
| 3246 | 0 | $a\,^5D_1 - z\,^3D_2°$ |
| 3265 | 0 | $a\,^5D_2 - z\,^3D_3°$ |

Using the current vs. wavelength plot shown partially in FIG. 2, specific spectral-line current peaks generated by the method of the invention can be identified according to their relative peak heights, shapes and spacings. For example, to set laser 30 at 3007 Å, an iron containing organometallic compound, such as ferrocene, is placed in cell 12 and the laser adjusted to about 3000 Å by conventional laser course tuning. Laser power and pulse-duration settings are in accordance with those described above. The laser wavelength is incremented and the currents produced are plotted. After a few current peaks have been generated, these can be identified visually with reference to the standard plot (FIG. 2). The laser is then adjusted to a wavelength producing the peak identified as the 3007 Å spectral line of iron.

The method of the present invention may also be used to provide continuous laser wavelength referencing. In this application, a pulsed beam from a tunable laser is split into two beams by conventional beam-splitting apparatus, with one of the two beams being focused and directed into a cell, such as cell 12, shown in FIG. 1. In this cell is placed a compound having as its metal constituent, an element such as iron, for which a standard current vs. wavelength graph, such as the one shown partially in FIG. 2, has previously been prepared. The other beam is directed toward apparatus containing a sample for which it is desired to determine wavelength dependence of a particular photoactivation process. As the laser wavelength output is incremented, the first-mentioned beam is used to generate by the method of the invention, a series of current peaks such as those shown in FIG. 2, associated with known wavelengths. These wavelength peaks provide, at the time of their occurrence, wavelength markers for the beam being directed at the sample under study.

While a preferred embodiment of the invention has been described herein, it is obvious that various changes and modifications may be made without departing from the spirit of the invention. It is contemplated, for example, to place device 28 in apparatus 10 in a conventional feedback laser-tuning circuit, to lock the laser at a wavelength producing a maximum measured photoionization current.

It is claimed and desired to secure by Letters Patent:

1. A method of referencing the beam wavelength of a tunable laser with a known spectral line wavelength of a free transition metal atom, said method comprising
    forming in an irradiation zone a vapor of a volatile organometallic compound containing said metal atom,
    applying a voltage across a pair of electrodes in such zone,
    irradiating such zone with a beam of laser light having an average power flux in the zone at which electronic transitions of the free metal atom are wavelength-dependent,
    by said irradiating, producing dissociation of the vapor-phase compound to form free metal atoms,
    monitoring the current flow between the electrodes, and
    adjusting the wavelength of the laser light to reach correspondence of the light wavelength and spectral line wavelength, such producing multiphoton ionization of the metal atoms, with the atoms proceeding through an excited state, as evidenced by a peaking of current flow.

2. The method of claim 1, wherein such wavelength is in the ultraviolet light region.

3. The method of claim 1, wherein the light beam is composed of pulses of light, each pulse having an average photon flux density in such zone between about 10 and 200 megawatts per square centimeter.

4. The method of claim 1, wherein the organometallic compound contains a transition metal and at least one from the group consisting of carbonyl, butadiene, cyclopentadiene, benzene and cyclooctatetraene.

5. The method of claim 4, wherein said organometallic compound contains iron and cyclopentadiene.

6. A method of referencing the beam wavelength of a tunable laser with a known single-photon excitation spectral line wavelength in a free transition metal atom, where the combined energy of two photons having that spectral line wavelength is less than the ionization potential of the free metal atom, said method comprising
    forming in an enclosed irradiation zone, a vapor of a volatile organometallic compound containing that metal atom,
    applying a voltage between a pair of electrodes in such zone,
    irradiating such zone with pulses of laser light having an average photon flux density in the zone at which substantially only one-photon electronic transitions in the metal atom occur,
    by said irradiating, producing dissociation of the vapor-phase compound to form free metal atoms, where the duration of the beam pulse is selected in relation to the vapor pressure of the organometallic compound to insure free metal atom collisions during a pulse,
    measuring the current flow between the electrodes, and
    adjusting the wavelength of the laser light pulses to reach correspondence of the light wavelength and spectral line wavelength, such producing multiphoton ionization of the metal atoms, with the atoms proceeding through an excited state, as evidenced by a peaking of current flow.

7. The method of claim 6, wherein such wavelength is in the ultraviolet light region.

8. The method of claim 6, wherein the pulse average photon flux density in such zone is between about 10 and 200 megawatts per square centimeter.

9. The method of claim 6, wherein the organometallic compound includes a transition metal atom and at least one from the group consisting of carbonyl, butadiene, cyclopentadiene, benzene and cyclooctatetraene.

10. The method of claim 6, wherein the compound contains iron and cyclopentadiene.

* * * * *